(12) United States Patent
Dugas et al.

(10) Patent No.: US 12,667,045 B2
(45) Date of Patent: Jun. 30, 2026

(54) BASECUTTER ASSEMBLY CONTROL FOR A SUGARCANE HARVESTER

(71) Applicant: Deere & Company, Moline, IL (US)

(72) Inventors: Bryan E. Dugas, Thibodaux, LA (US); Peter A. Johnson, Sartell, MN (US)

(73) Assignee: Deere & Company, Moline, IL (US)

( * ) Notice: Subject to any disclaimer, the term of this patent is extended or adjusted under 35 U.S.C. 154(b) by 337 days.

(21) Appl. No.: 18/475,282

(22) Filed: Sep. 27, 2023

(65) Prior Publication Data

US 2025/0098574 A1     Mar. 27, 2025

(51) Int. Cl.
| | |
|---|---|
| *A01D 34/80* | (2006.01) |
| *A01D 34/00* | (2006.01) |
| *A01D 34/66* | (2006.01) |
| *A01D 34/74* | (2006.01) |
| *A01D 45/10* | (2006.01) |

(52) U.S. Cl.
CPC ......... *A01D 34/668* (2013.01); *A01D 34/006* (2013.01); *A01D 34/74* (2013.01); *A01D 34/80* (2013.01); *A01D 45/10* (2013.01)

(58) Field of Classification Search
CPC ..... A01D 34/668; A01D 34/006; A01D 45/10
See application file for complete search history.

(56) References Cited

U.S. PATENT DOCUMENTS

| | | | | |
|---|---|---|---|---|
| 3,514,927 | A | * | 6/1970 | Giardina ................ A01D 45/10 |
| | | | | 56/10.4 |
| 9,894,832 | B2 | | 2/2018 | Scrivner et al. |
| 10,477,766 | B2 | | 11/2019 | Burch |
| 2012/0110968 | A1 | * | 5/2012 | Hinds .................... A01D 45/10 |
| | | | | 56/53 |
| 2013/0116894 | A1 | * | 5/2013 | Perez-Iturbe .......... A01D 45/10 |
| | | | | 701/50 |
| 2016/0073580 | A1 | * | 3/2016 | Scrivner ................ A01D 45/10 |
| | | | | 701/50 |

FOREIGN PATENT DOCUMENTS

CN         102221505 A  * 10/2011

OTHER PUBLICATIONS

ÂEngineering Properties of Sugarcane for the Development of Efficient Sugarcane Machineryâ Omprabha, et al., published Sep. 26, 2024, Sugar Tech, pp. 272-283 (Year: 2025).*

* cited by examiner

*Primary Examiner* — Cathleen R Hutchins

(57)                    ABSTRACT

A basecutter assembly for a sugarcane harvester includes a cutting spindle powered by a first power source, and a transport spindle powered by a second power source independent of the cutting spindle. A torque sensor is coupled to the cutting spindle. A harvester controller defines a target cutting torque value for the cutting spindle based on a desired crop cut height and determines a current cutting torque of the cutting spindle while cutting the crop. The harvester controller may then control a height of the cutting spindle relative to a ground surface to maintain the current cutting torque substantially equal to the target cutting torque value to achieve the desired crop cut height.

10 Claims, 5 Drawing Sheets

200 — Define Desired Crop Cut Height

202 — Define Target Cutting Torque Value

204 — Determine Current Cutting Torque

206 — Does Current Cutting Torque vary from Target Cutting Torque Value?

No — 208 — Maintain Current Crop Cut Height

Yes

210 — Adjust Crop Cut Height

212 — Estimate Crop Cut Height at Locations Throughout Field

214 — Generate Map of Crop Cut Height at Locations

216

BASECUTTER ASSEMBLY CONTROL FOR A SUGARCANE HARVESTER

TECHNICAL FIELD

The disclosure generally relates to a basecutter assembly for a sugarcane harvester, and a method of controlling the basecutter assembly.

BACKGROUND

A sugarcane harvester may include a basecutter assembly for severing stalks of standing crop near a ground surface. The basecutter assembly may be moveably attached to a main frame of the sugarcane harvester and moveable relative to the main frame to adjust a crop cut height. The basecutter assembly may include a cutting spindle having one or more blades attached thereto for severing for cutting the stalks of the crop. The basecutter assembly may additionally include a transport spindle having one or more transport devices attached thereto for moving the cut crop away from the cutting spindle and the blades, and toward further processing components of the sugarcane harvester, e.g., a conveyor, a chopper, a separator, etc.

It is desirable to control the position of the basecutter assembly relative to the ground surface to achieve a desired crop cut height to maximize crop yield. A lower crop cut height increases harvest thereby improving the yield of the crop. However, sugarcane is a perennial plant that regrows from the roots remaining after harvest. If the cutting blades of the basecutter contact the ground surface, the roots of the sugarcane may be damaged, thereby reducing future crop regrowth. It is therefore important to maintain a minimum cut crop height above the ground surface to minimize damage to the remaining crop stubble. Maintaining proper positioning of the cutting blades above the ground surface, i.e., maintaining the desired crop cut height, is also important in preventing contact between the cutting blades and the ground surface, which may damage the cutting blades and/or reduce overall life expectancy of the cutting blades.

SUMMARY

A basecutter assembly for a sugarcane harvester is provided. The basecutter assembly includes a cutting spindle supporting a cutting blade for cutting crop, and a transport spindle supporting a transport device for moving the cut crop away from the cutting blade. The basecutter assembly further includes a first power source coupled to the cutting spindle and operable to rotate the cutting spindle, and a second power source coupled to the transport spindle and operable to rotate the transport spindle. The first power source is separate from the second power source such that the cutting spindle and the transport spindle are rotated independently of each other. A torque sensor is coupled to cutting spindle. The torque sensor is operable to sense data related to a current torque of the cutting spindle. A harvester controller includes a processor and a memory having a height control algorithm stored thereon. The processor is operable to execute the height control algorithm to define a target torque value of the cutting spindle based on a desired crop cut height. The harvester controller may then determine a current cutting torque of the cutting spindle while cutting the crop. The current cutting torque of the cutting spindle may be determined from data sensed by the torque sensor related to the current torque of the cutting spindle. The harvester controller may then communicate a control signal to control a height of the cutting spindle relative to a ground surface based on a difference between the target torque value of the cutting spindle and the current cutting torque of the cutting spindle while cutting crop.

In one aspect of the disclosure, the first power source may include, but is not limited to, a hydraulic motor. The torque sensor may include, but is not limited to, a pressure sensor operable to detect data related to a fluid pressure associated with the first power source, e.g., the hydraulic motor. However, it should be appreciated that the first power source and the corresponding torque sensor may differ from the example implementation of the hydraulic motor and pressure sensor respectively. For example, in another implementation, the first power source may include an electric motor, and the torque sensor may include, but is not limited to, an impedance sensor. Additionally, the torque sensor may be configured as a sensor operable to detect torque and/or strain of a cutting blade and/or a component interconnecting the cutting blade and the first power source, for example, the cutting spindle.

In one aspect of the disclosure, the processor may be operable to execute the height control algorithm to receive the desired crop cut height. The desired crop cut height may be received via a user input device, such as but not limited to, a touch screen display, a button, a switch, a slide lever, a voice command, etc. The desired crop cut height may be input by an operator via the user input device. In another implementation, the desired crop cut height may be received by the harvester controller via a control algorithm that selects and communicates the desired crop cut height to the harvester controller automatically. The control algorithm may select the desired crop cut height based on data stored in a memory of the harvester controller, such as but not limited to previous harvest operations in the same location, crop type, soil type, etc.

In one aspect of the disclosure, the processor may be operable to execute the height control algorithm to determine the current cutting torque of the cutting spindle by subtracting an unloaded torque value from the current torque of the cutting spindle while cutting the crop, sensed by the torque sensor. The unloaded torque value may include and/or be defined as the torque transmitted by the cutting spindle while rotating the cutting spindle and associated blades and while not contacting, engaging, and/or cutting crop material. As such, the unloaded torque value represents the amount of torque required to rotate the cutting spindle and associated blades at the desired rotational speed without engaging any foreign objects, e.g., crop, ground surface, etc.

In one aspect of the disclosure, the processor may be operable to execute the height control algorithm to determine the unloaded torque value based on data from the torque sensor related to the current torque of the cutting spindle while not cutting the crop and/or while not engaged with the crop or other foreign objects.

In one aspect of the disclosure, the processor may be operable to execute the height control algorithm to calculate an estimated crop cut height at a location based on the current cutting torque of the cutting spindle while cutting the crop at that location. The harvester controller may then generate a map identifying a plurality of locations and the respective estimated crop cut height at each of the plurality of locations. The harvester controller may then define the desired crop height based on the estimated crop cut height at one of the plurality of locations included in the map.

In one aspect of the disclosure, the basecutter assembly is attached to a sugarcane harvester. The sugarcane harvester includes a main frame that is moveable across a field to harvest crop material. The basecutter assembly is supported by the main frame. The basecutter is moveable relative to the main frame to adjust the crop cut height, e.g., the height of the cutting spindle relative to the ground surface.

A method of controlling a sugarcane harvester is also provided. The sugarcane harvester includes a basecutter assembly having a cutting spindle rotated by a first power source and a transport spindle independently rotated by a second power source relative to the cutting spindle. The method includes defining a target cutting torque value of the cutting spindle based on a desired crop cut height with a harvester controller. The harvester controller may then determine a current cutting torque of the cutting spindle while cutting a crop. The current cutting torque is determined from data related to the current torque of the cutting spindle sensed by a torque sensor while cutting the crop. The harvester controller may then control a height of the basecutter assembly relative to the ground surface based on a difference between the target cutting torque and the current cutting torque of the cutting spindle when cutting crop.

In one aspect of the disclosure, the method described herein may determine the current cutting torque of the cutting spindle subtracting an unloaded torque value from the current torque of the cutting spindle sensed by the torque sensor while cutting the crop.

Accordingly, by using the first power source to power the cutting spindle, and the second power source to separately power the transport spindle, the power usage of each is decoupled from the other. As such, the power output and torque from the first power source is dependent upon only the torque on the cutting spindle, and is not affected by the torque of the transport spindle. The torque transmitted through the cutting spindle is associated with the cut crop height and/or contact with the ground surface. As such, decoupling the power usage of the cutting spindle and the transport spindle enables the power output of the first power source to predict the torque in the cutting spindle. The torque in the cutting spindle may then be used to predict crop cut height and control the height of the cutting spindle relative to the ground surface. As such, by decoupling the power usage of the cutting spindle and the transport spindle, the torque required to rotate the cutting spindle and/or the power output from the first power source may be accurately sensed and used as a feed to control a height of the basecutter assembly relative to the ground surface.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward,"

"top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
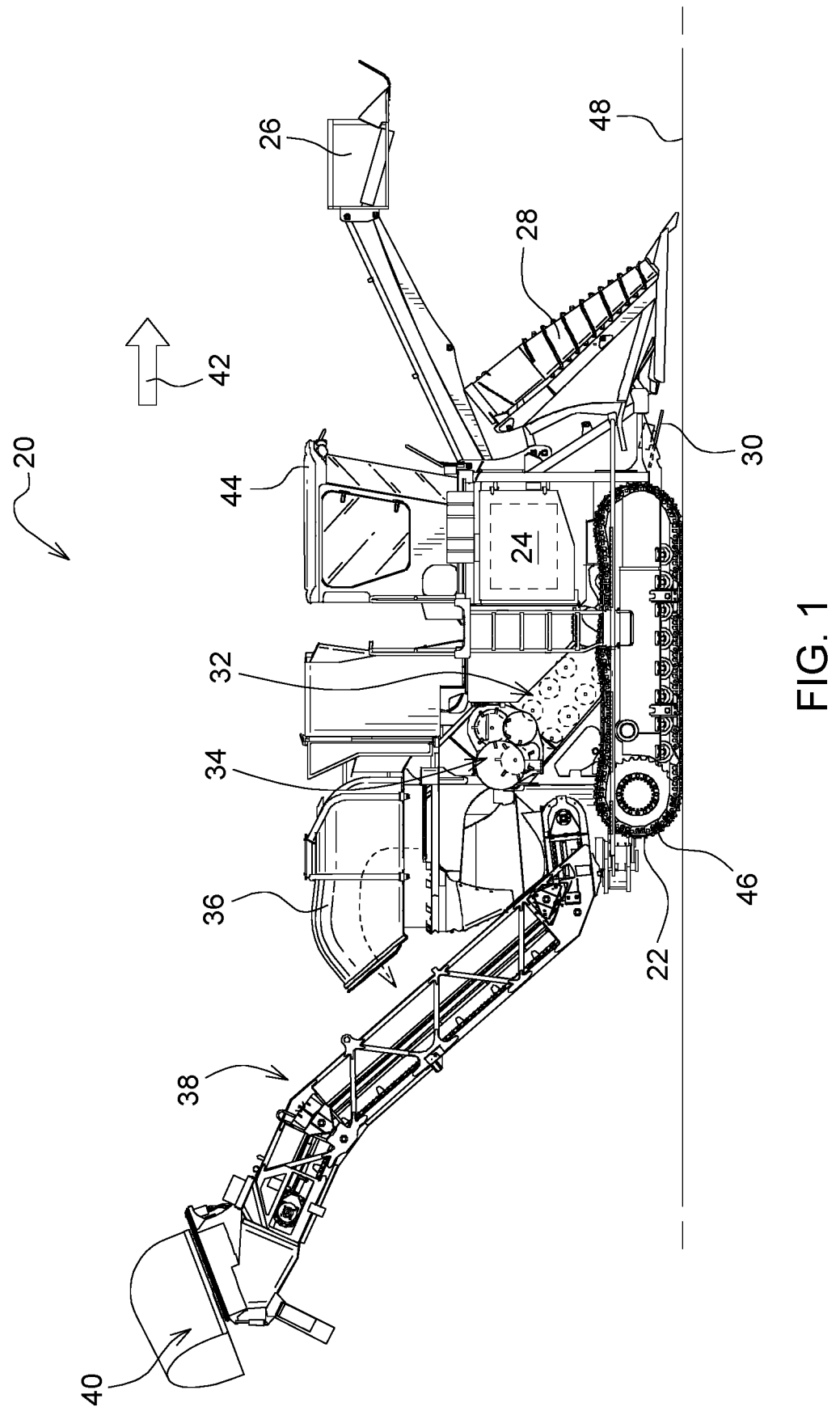
FIG. 1 is a schematic side elevation view of a sugarcane harvester.

Referring to the Figures, wherein like numerals indicate like parts throughout the several views, a sugarcane harvester is generally shown at 20 in FIG. 1. The sugarcane harvester 20 includes a main frame 22, supporting various cutting, routing and processing devices. An engine 24 may supply power for driving the sugarcane harvester 20 along a field and for powering various driven components of the sugarcane harvester 20. In certain embodiments, the engine 24 may directly power a main hydraulic pump (not shown). Various driven components of the sugarcane harvester 20 may be powered by hydraulic motors receiving hydraulic power from the main hydraulic pump via one or more hydraulic loops (not shown).

Referring to FIG. 1, among other components and features, some of which are not described herein, the sugarcane harvester 20 may include a topper 26, a left and a right crop divider scroll 28 (the left crop divider scroll 28 is not shown), an upper knockdown roller and a lower knockdown roller (the upper and lower knockdown rollers are not shown), a basecutter assembly 30, a feed section 32, a chopping section 34, a primary extractor 36, an elevator 38, and a secondary extractor 40.

The topper 26 is adapted to cut off a leafy top portion of sugarcane plants so as not to be ingested into the sugarcane harvester 20. The left and right crop divider scroll 28s are adapted to lift the sugarcane for feeding into a throat of the sugarcane harvester 20. The upper and lower knockdown rollers are adapted to lean standing stalks of crop material in a forward direction relative to a direction of travel 42 of the sugarcane harvester 20 during operation. The basecutter assembly 30 is adapted to sever the sugarcane stalk knocked down or leaned over in a forward direction by the upper and lower knockdown rollers. Additionally, the basecutter assembly 30 is operable to move and/or feed the severed sugarcane stalk to the feed section 32.

The feed section 32 is adapted to receive a mat of severed sugarcane crop material from the basecutter assembly 30, and to move the mat of crop material rearwardly for further processing. The feed section 32 may include, for example, successive pairs of upper and lower feed rollers rotatably supported by the main frame 22. At least one pair of the upper and lower feed rollers may be powered to transport the mat of the cut sugarcane crop material to the chopping section 34.

The chopping section 34 is adapted to receive the mat from the feed section 32 and to cut the sugarcane stalk into billets. The primary extractor 36 is positioned downstream from the chopping section 34 and is adapted to separate debris, including, for example, crop residue (e.g., leafy material), from the billets and remove the debris from the sugarcane harvester 20.

The elevator 38 is positioned at the rear of the sugarcane harvester 20 to receive the cleaned flow of billets, and is adapted to convey the billets to an elevated position where the billets are discharged into a transport vehicle to be hauled away. The secondary extractor 40 (some embodiments may not have a secondary extractor 40) is positioned near the top of the elevator 38, and is adapted to further separate debris from the billets and to remove the debris from the sugarcane harvester 20.

The sugarcane harvester 20 may include an operator station 44 and traction elements 46. The various user input and control devices, data output devices, etc., may be located within the operator station 44. A human operator may operate the sugarcane harvester 20 from the operator station 44. In certain embodiments, the main frame 22 may be supported by a transport frame such as track frame supporting the traction elements 46. The traction elements 46 are positioned on the left and right sides of the sugarcane harvester 20 for propelling the sugarcane harvester 20 through a field and along a ground surface 48. Each traction element 46 may include, but are not limited to, a track unit or a ground-engaging wheel.

Figure 2:
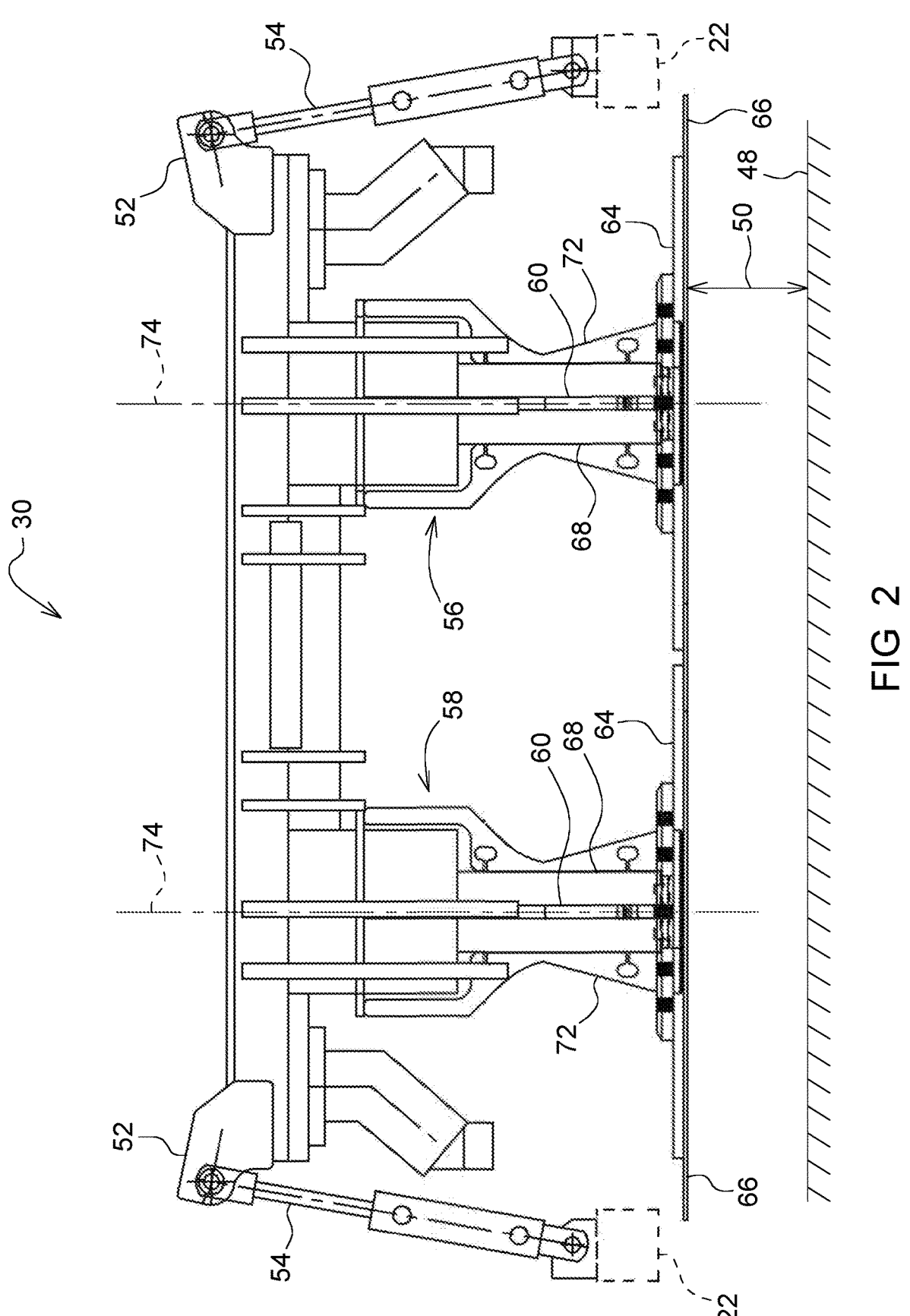
FIG. 2 is a schematic cross sectional view of a basecutter assembly of the sugarcane harvester.

The basecutter assembly 30 is supported by the main frame 22 and is moveable relative to the main frame 22 to adjust a crop cut height 50. The basecutter assembly 30 may be moveably attached to the main frame 22 in a manner that enables vertical adjustment of the basecutter assembly 30 relative to the ground surface 48. For example, referring to FIG. 2, the basecutter assembly 30 may include a cutter frame 52 pivotably attached to the main frame 22 for rotational movement about a transverse horizontal axis relative to the direction of travel 42 during operation. An actuator 54 may interconnect the cutter frame 52 and the main frame 22 for controlling the position of the cutter frame 52 relative to the main frame 22, and thereby controlling a crop cut height 50 relative to the ground surface 48. The actuator 54 may include, but is not limited to, a hydraulic actuator 54, an electric actuator 54, a pneumatic actuator 54, etc. It should be appreciated that the components and manner in which the basecutter assembly 30 is mounted to the main frame 22, including the actuator 54, may vary from the example description herein.

Figure 3:
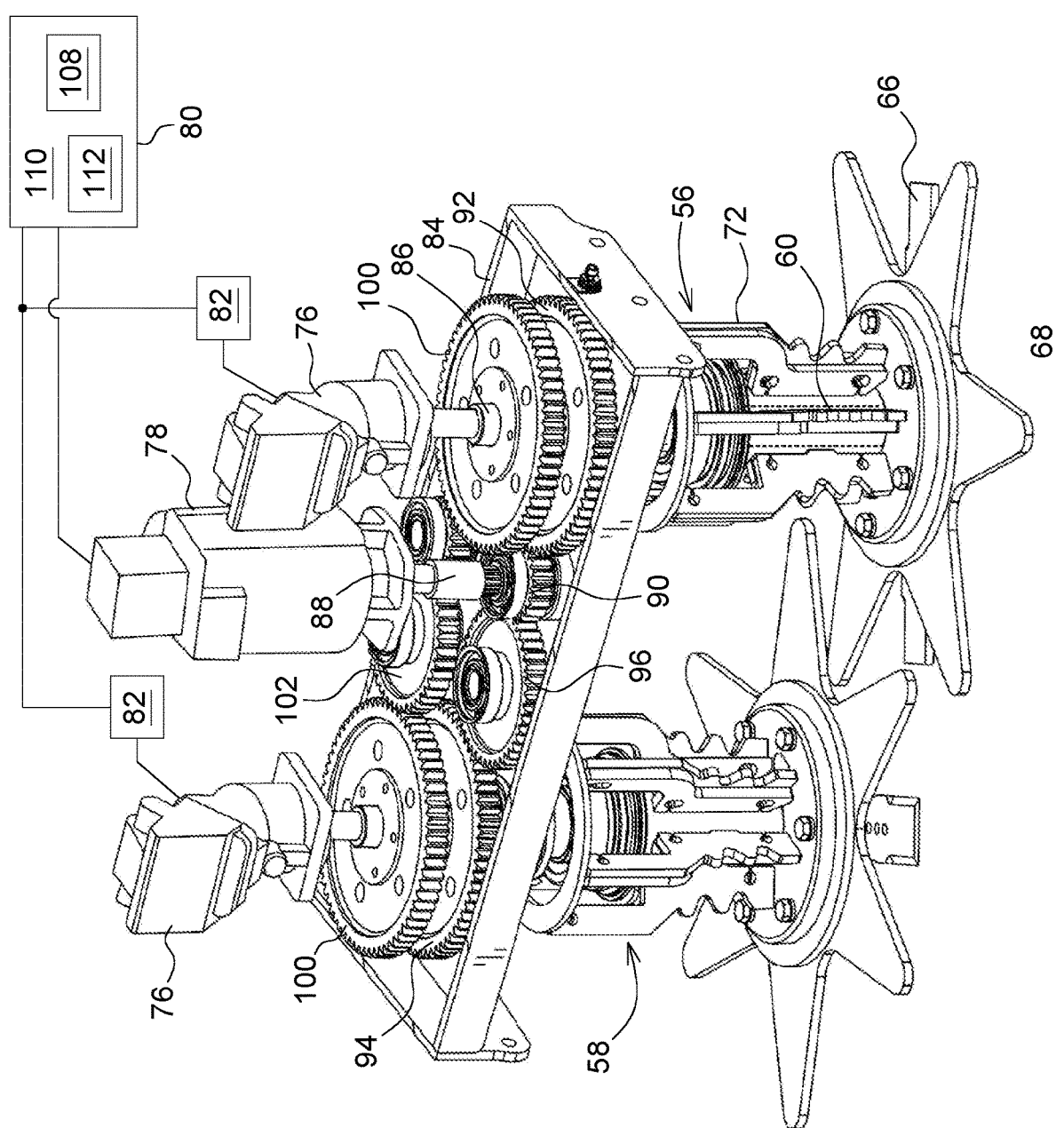
FIG. 3 is a schematic perspective view of the basecutter assembly of the sugarcane harvester.
Figure 4:
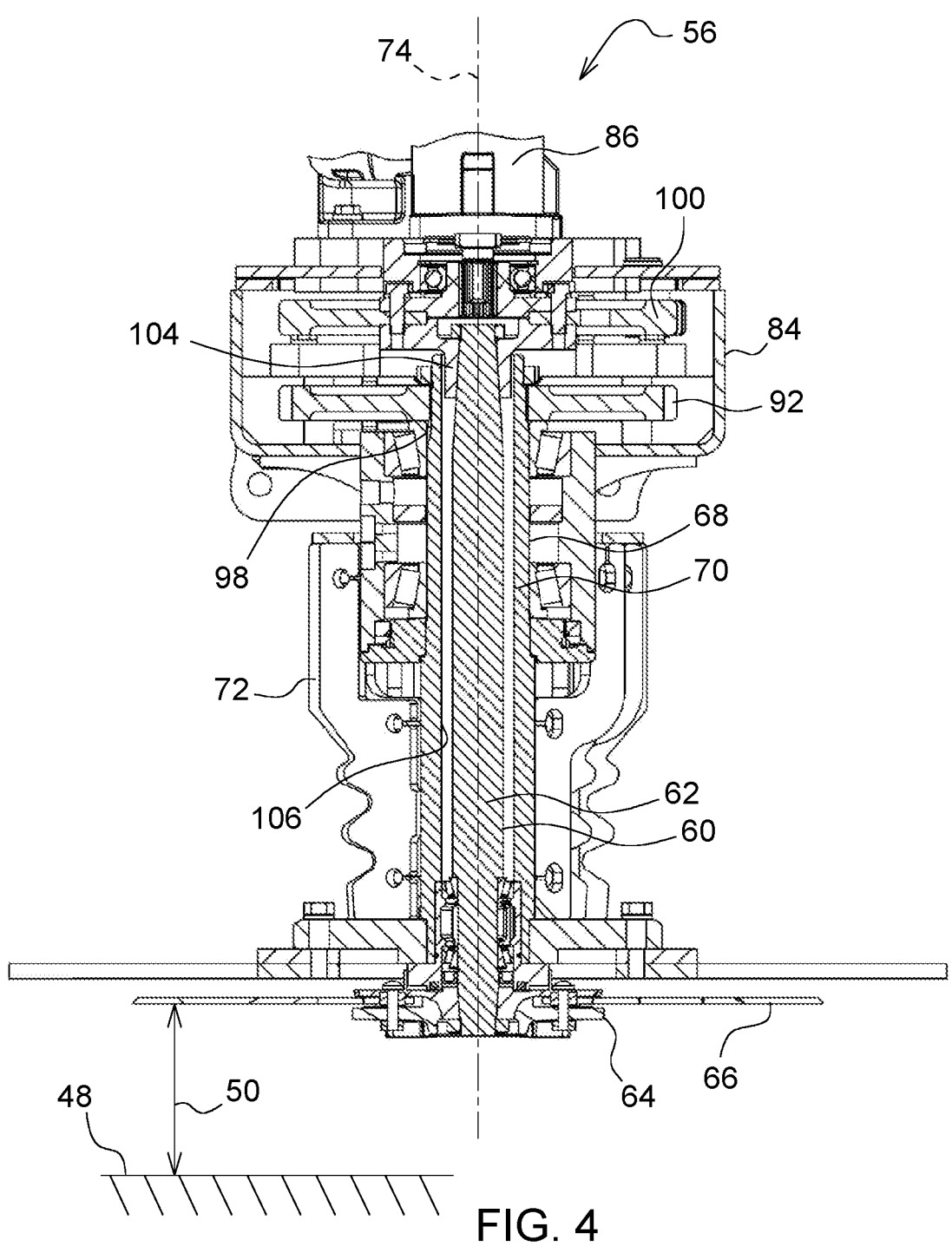
FIG. 4 is a schematic cross-sectional view of the basecutter assembly.

Referring to FIGS. 3-4, the example implementation of the basecutter assembly 30 includes a first spindle assembly 56 and a second spindle assembly 58. However, in other implementations, the basecutter assembly 30 may include only a single spindle assembly. The first spindle assembly 56 and the second spindle assembly 58 may be configured substantially identically. As such, for convenience, only the first spindle assembly 56 is described in greater detail herein. It should be appreciated that the second spindle assembly 58 may be constructed in a similar manner to the first spindle assembly 56 described herein.

The first spindle assembly 56 includes a cutting spindle 60 having a rotatable shaft 62 and a cutting disk 64 mounted to the shaft 62 for rotation therewith. The cutting disk 64 includes one or more cutting blades 66 positioned about a periphery of the cutting disk 64 for cutting sugarcane crop material. The first spindle assembly 56 further includes a transport spindle 68. The transport spindle 68 includes a hollow shaft 70 and supports a transport device 72 adapted for moving the cut crop material away from the cutting blades 66 of the cutting spindle 60 and for feeding the severed sugarcane stalk rearward toward the feed section 32.

The transport device 72 of the transport spindle 68 may include, but is not limited to, one or more rotating disks, guides, paddles, vertical ribs, or other devices configured to direct the cut sugarcane crop material upwardly and rearward within the sugarcane harvester 20 toward the feed section 32 of the sugarcane harvester 20. The specific configuration components and configuration of the transport device 72 are understood by those skilled in the art, are not pertinent to the teachings of this disclosure, and are therefore not described in greater detail herein.

The cutting spindle 60 and the transport spindle 68 are arranged to rotate about a first rotation axis 74 in a manner independent of one another. In the example implementation shown in the Figures and described herein, the shaft 62 of the cutting spindle 60 is positioned within the hollow shaft 70 of the transport spindle 68, such that the cutting spindle 60 and the transport spindle 68 are rotatable relative to one another via bearings, bushings, etc., positioned therebetween.

As shown in FIG. 3, the basecutter assembly 30 includes a first power source 76 and a second power source 78. The first power source 76 is coupled to the cutting spindle 60 to rotate the cutting spindle 60 about the first rotation axis 74. The second power source 78 is coupled to the transport spindle 68 to rotate the transport spindle 68 about the first rotation axis 74. The first power source 76 is separate from the second power source 78 such that the cutting spindle 60 and the transport spindle 68 are rotated independently of each other.

The first power source 76 may include a device capable of generating a rotational output, such as but not limited to, a hydraulic motor, an electric motor, or some other torque generating device. In the example implementation described herein, the first power source 76 is configured as a hydraulic motor. The hydraulic motor may receive a flow of hydraulic fluid from the main hydraulic pump powered by the engine 24 of the sugarcane harvester 20. The hydraulic motor may be controlled, for example via a harvester controller 80 and/or user input commands, to provide a desired rotational speed and/or torque output to the cutting spindle 60 for rotating the cutting spindle 60.

The second power source 78 may include a device capable of generating a rotational output, such as but not limited to, a hydraulic motor, an electric motor, or some other torque generating device. In the example implementation described herein, the second power source 78 is configured as a hydraulic motor. The hydraulic motor may receive a flow of hydraulic fluid from the main hydraulic pump powered by the engine 24 of the sugarcane harvester 20. The hydraulic motor may be controlled, for example via the harvester controller 80 and/or user input commands, to provide a desired rotational speed and/or torque output to the transport spindle 68 for rotating the transport spindle 68.

A torque sensor 82 is coupled to the first power source 76. The torque sensor 82 is operable to sense data related to a current torque of the cutting spindle 60. The torque sensor 82 may be disposed in communication with the harvester controller 80 and operable to communicate sensed data thereto. The type and operation of the torque sensor 82, and the particular data sensed by the torque sensor 82, may be dependent upon the particular implementation of the first power source 76. For example, if the first power source 76 is implemented as a hydraulic motor, then the torque sensor 82 may be configured to include a pressure sensor operable to detect data associated with a fluid pressure of the hydraulic motor of the first power source 76. In other implementations, if the first power source 76 is configured as an electric motor, then the torque sensor 82 may be configured to include an electrical sensor operable to detect data related to the output of the electric motor, such as but not limited to an impedance sensor, a resistance sensor, a voltage sensor, an amperage sensor, etc. In other implementations, the particular data sensed by the torque sensor 82, may be independent of the particular implementation of the first power source 76. For example, the torque sensor 82 may include a device that detects data related to power and/or torque applied to the cutting spindle 60 and/or transmitted between the cutting spindle 60 and the first power source 76. For example, the power sensor may include, but is not limited to, a strain sensor or some other torque sensing device that detects data related to torque applied to the cutting spindle 60, a cutting blade 66, or some other component directly connecting the cutting blades 66 and the first power source 76.

Referring to FIGS. 3-4, an example configuration of the basecutter assembly 30 is shown. It should be appreciated that the basecutter assembly 30 may be configured differently than the example implementation shown in the Figures and described herein. The basecutter assembly 30 includes a gearbox 84, with a first input interface 86 and a second input interface 88. As shown in the example implementation, the first input interface 86 includes a pair of inputs. However, in other implementations, it should be appreciated that the first input interface 86 may include only a single input. As depicted, the first and second input interface 88s may be configured as splined female connectors. The first input interface 86 is adapted to receive an output shaft from the first power source 76. As shown in the example implementation, the first power source 76 includes a pair of power sources, with each one of the pair of power sources coupled to a respective one of the first input interfaces 86. However, in other implementations, it should be appreciated that the first power source 76 may include only a single power source coupled to a single first input interface 86.

The second input interface 88 is adapted to receive an output shaft from the second power source 78. The second input interface 88 is configured such that rotational power received at the second input interface 88 from the second power source 78 causes an input gear 90 to rotate. The input gear 90, in turn, rotates a first main gear 92 directly and a second main gear 94 via a timing gear 96. Each of the first main gear 92 and the second main gear 94 is connected to an output interface 98 (e.g., another splined female connector). The transport spindle 68 engages the output interface 98 such that rotation of the output interface 98 rotates the transport spindle 68.

The first input interfaces 86 are configured such that rotational power received at the first input interfaces 86 from the first power source 76 causes a pair of main gears 100 to rotate. In the embodiment depicted, timing gears 102 are provided to ensure that the main gears 100 rotate at the same speed. In certain embodiments, however, the main gears 100 (or the first input interfaces 86) may be configured to rotate at different speeds. Each of the first input interfaces 86 is connected (e.g., via the main gears 100) to an output interface 104 (e.g., another splined female connector).

For reach of the first spindle assembly 56 and the second spindle assembly 58, the respective cutting spindle 60 extends within a bore 106 through the respective hollow shaft 70 of the transport spindle 68, such that the cutting spindle 60 may rotate within, and relatively independently of, the transport spindle 68. The cutting spindle 60 engages the output interface 104 such that rotation of the output interface 104 rotates the cutting spindle 60.

With the cutting spindles 60 extending within the bores 106 through the transport spindles 68, the cutting spindles 60 may be rotated at different speeds and in different directions from the transport spindles 68. For example, the first power source 76 at the first input interface 86 may cause the cutting spindles 60 to rotate at a first speed, and the second power source 78 at the second input interface 88 may cause the transport spindles 68 to rotate at a second, different speed. In certain embodiments, the cutting spindles 60 and transport spindles 68 may additionally (or alternatively) be rotated in opposite directions.

As noted above, the sugarcane harvester 20 includes the harvester controller 80. The harvester controller 80 may be disposed in communication with the torque sensor 82, the first power source 76, and the actuator 54. The harvester controller 80 is operable to receive data signals from the torque sensor 82, and control operation of the first power source 76 and the actuator 54. While the harvester controller 80 is generally described herein as a singular device, it should be appreciated that the harvester controller 80 may include multiple devices linked together to share and/or communicate information therebetween. Furthermore, it should be appreciated that the harvester controller 80 may be located on the sugarcane harvester 20 or located remotely from the harvester controller 80.

The harvester controller 80 may alternatively be referred to as a computing device, a computer, a controller, a control unit, a control module, a module, etc. The harvester controller 80 includes a processor 108, a memory 110, and all software, hardware, algorithms, connections, sensors, etc., necessary to manage and control the operation of the first power source 76 and the actuator 54. As such, a method may be embodied as a program or algorithm operable on the harvester controller 80. It should be appreciated that the harvester controller 80 may include any device capable of analyzing data from various sensors, comparing data, making decisions, and executing the required tasks.

As used herein, "controller" is intended to be used consistent with how the term is used by a person of skill in the art, and refers to a computing component with processing, memory, and communication capabilities, which is utilized to execute instructions (i.e., stored on the memory 110 or received via the communication capabilities) to control or communicate with one or more other components. In certain embodiments, the harvester controller 80 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The harvester controller 80 may be in communication with other components on the sugarcane harvester 20, such as hydraulic components, electrical components, and operator inputs within the operator station 44. The harvester controller 80 may be electrically connected to these other components by a wiring harness such that messages, commands, and electrical power may be transmitted between the harvester controller 80 and the other components. Although the harvester controller 80 is referenced in the singular, in alternative embodiments the configuration and functionality described herein can be split across multiple devices using techniques known to a person of ordinary skill in the art.

The harvester controller 80 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 110 may include any non-transitory/tangible medium which participates in providing data or computer-readable instructions. The memory 110 may be non-volatile or volatile. Non-volatile media may include, for example, optical or magnetic disks and other persistent memory. Example volatile media may include dynamic random access memory (DRAM), which may constitute a main memory. Other examples of embodiments for memory 110 include a floppy, flexible disk, or hard disk, magnetic tape or other magnetic medium, a CD-ROM, DVD, and/or any other optical medium, as well as other possible memory devices such as flash memory.

The harvester controller 80 includes the tangible, non-transitory memory 110 on which are recorded computer-executable instructions, including a height control algorithm 112. The processor 108 of the harvester controller 80 is configured for executing the height control algorithm 112. The height algorithm implements a method of controlling the basecutter assembly 30, described in detail below.

The method of controlling the basecutter assembly 30 of the sugarcane harvester 20 includes the harvester controller 80 receiving a desired crop cut height 50. The desired crop cut height 50 may be defined as the desired elevation of cut above the ground surface 48, i.e., the elevation above the ground surface 48 at which the crop material is cut or severed. The step of defining the desired crop cut height 50 is generally indicated by box 200 shown in FIG. 5. The desired crop cut height 50 affects harvest efficiency. Additionally, because the sugarcane crop is a perennial plant, maintaining the desired crop cut height 50 prevents damage to crop roots remaining in the ground, which in turn affects crop re-growth in the future. The desired crop cut height 50 is set and/or defined to maximize harvest efficiency while preventing the cutting blades 66 from contacting the ground surface 48 and potentially damaging the crop roots. The desired crop cut height 50 may vary depending upon the elevation profile of the ground surface 48, the crop type, crop density, etc.

In one implementation, the desired crop cut height 50 may be input into the harvester controller 80 manually via the operator. The operator may enter the desired crop cut height 50 using an input device, e.g., a touchscreen display, keyboard, mouse, etc. In other implementations, the desired crop cut height 50 may be automatically entered and/or defined by the harvester controller 80, or another system controller of the sugarcane harvester 20, based on prior defined field data. For example, the harvester controller 80 may reference a previously created map, chart, data set, etc., created during a previous harvesting operation of the same field to define the desired crop cut height 50. For example, as described in greater detail below, a map be saved on the memory 110 of the harvester controller 80 correlating multiple geographic locations with an estimated crop cut height 50 for each respective geographic location and with the operational settings used by the sugarcane harvester 20 to achieve the estimated crop cut height 50. The harvester controller 80 may then determine/define the desired cut crop height for the current harvest operation based on the estimate crop cut height 50 included in the map saved on the memory 110 from the previous harvest operation. As such, the harvester controller 80 may use data from previous harvest operation to define the desired crop cut height 50 for future harvest operations.

The harvester controller 80 may then define a target cutting torque value for the cutting spindle 60 based on the desired crop cut height 50. The step of defining the target cutting torque value is generally indicated by box 202 shown in FIG. 5. The target cutting torque value may be expressed as an actual torque value, or may be expressed by some other property or characteristic associated with and related to torque. For example, the target cutting torque value may be expressed in terms of, but is not limited to, a power value, a load value, a pressure value, an impedance value, a resistance value, a voltage value, an amperage value, a strain value, etc. The torque experienced by the cutting spindle 60 is directly related to the crop cut height 50. As the crop cut height 50 relative to the ground surface 48 decreases, the torque experienced by the cutting spindle 60 increases. In contrast, as the crop cut height 50 relative to the ground surface 48 increases, the torque experienced by the cutting spindle 60 decreases. The target cutting torque value may be defined as the desired or expected torque communicated between the first power source 76 and the cutting spindle 60 that correlates to the desired crop cut height 50. The harvester controller 80 may make or define this correlation based upon previously defined tables or relationships developed via testing and product development, and which may be saved on the memory 110 of the harvester controller 80.

The harvester controller 80 may then determine a current cutting torque of the cutting spindle 60 while cutting the crop. The step of determining the current cutting torque is generally indicated by box 204 shown in FIG. 5. The current cutting torque may be expressed as an actual torque value, or as a property or characteristic associated with and related to torque. For example, the current cutting torque may be expressed in terms of, but is not limited to, a power value, a load value, a pressure value, an impedance value, a resistance value, a voltage value, an amperage value, a strain value, etc. In order to do so, the harvester controller 80 may use data sensed by the torque sensor 82 related to the current torque of the cutting spindle 60 while the sugarcane harvester 20 is cutting and harvesting the crop. As described above, the particular type of data sensed may be dependent upon the configuration of the first power source 76, such as a fluid pressure output by the first power source 76, or may be a direct torque measurement such as but not limited to a torque or strain sensor coupled to the cutting spindle 60. The harvester controller 80 may use this data to calculate or otherwise determine the actual torque communicated between the first power source 76 and the cutting spindle 60 at the time the data was detected, i.e., the current cutting torque. It should be appreciated that the current cutting torque is continuously changing during operation, and that the harvester controller 80 may continuously determine the current cutting torque at distinct time intervals during operation throughout the field.

The harvester controller 80 may determine the current cutting torque by subtracting an unloaded torque value from the current torque of the cutting spindle 60 while cutting the crop. The unloaded torque value may include and/or be defined as the torque communicated between the first power source 76 and the cutting spindle 60 while rotating the cutting spindle 60 and associated blades and while not contacting, engaging, and/or cutting crop material. As such, the unloaded torque value represents the amount of torque required to rotate the cutting spindle 60 and associated blades at the desired rotational speed without engaging any foreign objects, e.g., crop, ground surface 48, etc.

The unloaded torque value may be defined during manufacture as a set value for the sugarcane harvester 20. However, it should be appreciated that in some implementations, such as the first power source 76 including a hydraulic motor, the unloaded torque value may change due to fluid temperature, fluid degradation from use, component wear, etc. Accordingly, in one implementation, the harvester controller 80 may be configured to determine the unloaded torque value based on data from the torque sensor 82 related to the current torque of the cutting spindle 60 while not cutting the crop. In other words, the harvester controller 80 may use the current torque of the cutting spindle 60 when not cutting crop material to determine the unloaded torque value. The harvester controller 80 may determine the unloaded torque value, for example, at machine start up, at headland turns when the basecutter assembly 30 is disengaged and not cutting crop material, or at other times during operation in which the basecutter assembly 30 is operating in an unloaded condition.

It should be appreciated that as the sugarcane harvester 20 moves through the field, changes in the ground surface 48 elevation may cause the actual crop cut height 50 to vary from the desired crop cut height 50. Variations in the actual crop cut height 50 may have a resultant effect on the torque communicated between the cutting spindle 60 and the first power source 76. For example, if the actual crop cut height 50 is lowered due to an increase in the elevation of the ground surface 48, the torque required to rotate the cutting spindle 60 and the associated cutting blades 66 at an optimal rotational speed may increase.

The harvester controller 80 may determine if the current cutting torque of the cutting spindle 60 during operation varies from the commanded target cutting torque value of the cutting spindle 60. The step of determining if the current cutting torque differs or varies from the target cutting torque value is generally indicated by box 206 shown in FIG. 5. The harvester controller 80 may determine that the current cutting torque varies from the target cutting torque value if the current cutting torque is outside an allowable range, i.e., if the current cutting torque is less than a minimum range value or if the current cutting torque is greater than a maximum range value. The allowable range may be defined based on expected variations in torque communication of the basecutter assembly 30. As an example, the minimum range value may be defined to include a value approximately ten percent lower than the target cutting torque value, and the maximum range value may be defined to include a value approximately ten percent greater than the target cutting torque value. It should be appreciated that the minimum range value and the maximum range value may be defined differently than the example range described herein.

Figure 5:
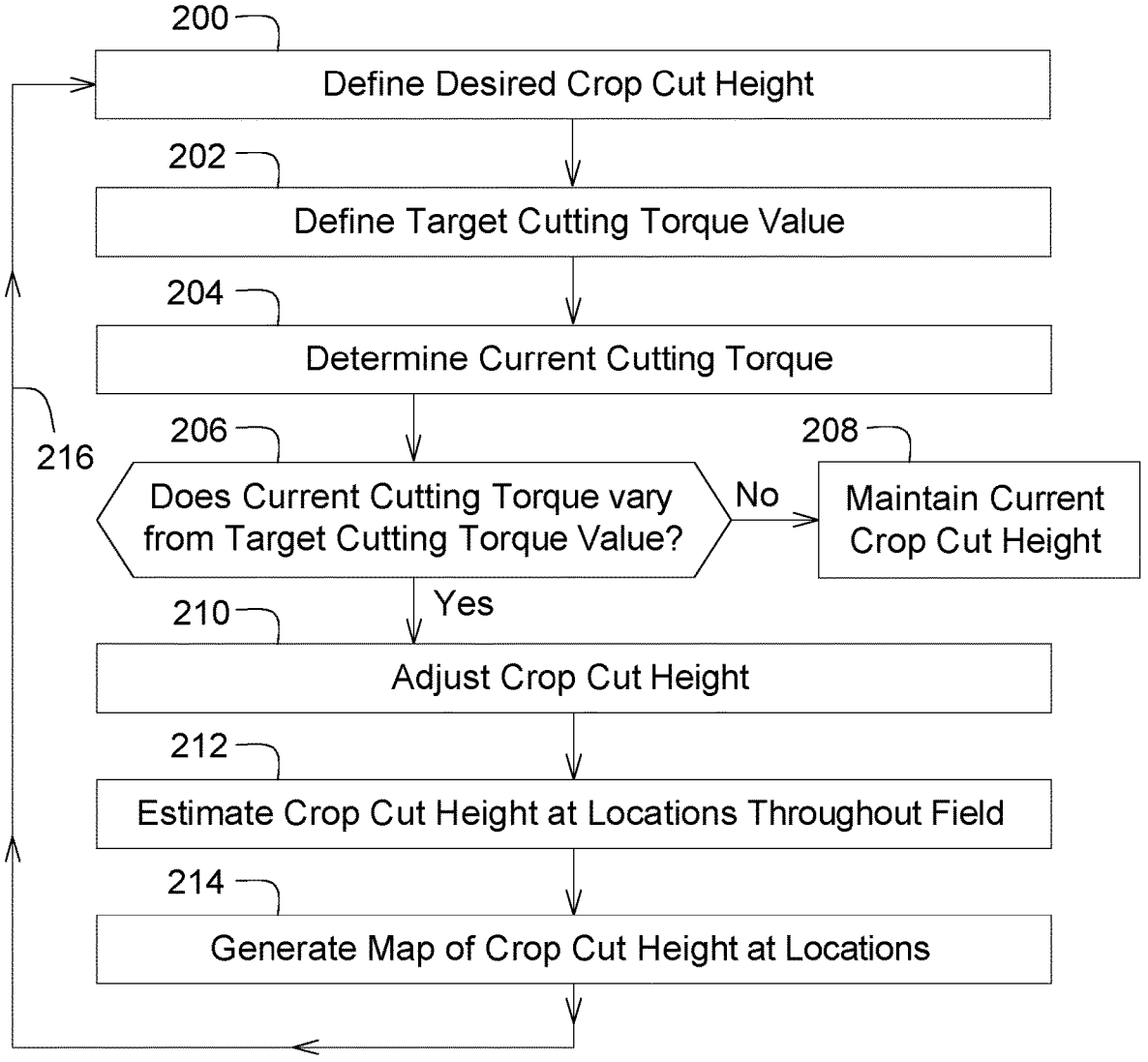
FIG. 5 is a flowchart representing a method of controlling the basecutter assembly.

If the harvester controller 80 determines that the current cutting torque does not vary from the target cutting torque value, then the harvester controller 80 may maintain the position of the cutting spindle 60 relative to the ground surface 48, generally indicated by box 208 shown in FIG. 5.

The harvester controller 80 may control a height of the cutting spindle 60 relative to the ground surface 48 based on the current cutting torque of the cutting spindle 60 while cutting the crop. For example, if the harvester controller 80 determines that the current cutting torque is different than the target cutting torque value, e.g., if the current cutting torque is not within the allowable range of the target cutting torque value, then the harvester controller 80 may raise or lower the cutting spindle 60 relative to the ground surface 48 until the current cutting torque is approximately and/or substantially equal to the target cutting torque value, e.g., within the allowable range of the target cutting torque value. The step of adjusting the crop cut height 50 when the harvester controller 80 determines that the current cutting torque does vary from the target cutting torque value is generally indicated by box 210 shown in FIG. 5. For example, if the current cutting torque of the cutting spindle 60 is lower than the target cutting torque value, the cutting blades 66 attached to the cutting spindle 60 are likely positioned too high relative to the ground surface 48. As such, when the current cutting torque of the cutting spindle 60 is lower than the target cutting torque value, then the harvester controller 80 may lower the elevation of the cutting spindle 60 relative to the ground surface 48 to increase the current cutting torque to equal the target cutting torque value. In contrast, for example, if the current cutting torque of the cutting spindle 60 is greater than the target cutting torque value, the cutting blades 66 attached to the cutting spindle 60 are likely positioned too low relative to the ground surface 48. As such, when the current cutting torque of the cutting spindle 60 is greater than the target cutting torque value, then the harvester controller 80 may increase the elevation of the cutting spindle 60 relative to the ground surface 48 to decrease the current cutting torque to equal the target cutting torque value.

In the example implementation shown in the Figures and described herein, the harvester controller 80 may control the height of the cutting spindle 60 by controlling the actuator 54 to raise or lower the cutter frame 52 relative to the main frame 22, thereby adjusting the height of the basecutter assembly 30, including the cutting spindle 60 and the blades attached thereof, relative to the ground surface 48. The manner in which the harvester controller 80 controls the actuator 54 is dependent upon the specific configuration of the actuator 54. For example, if the actuator 54 includes a hydraulic cylinder operable to extend and retract in response to fluid flow thereto, the harvester controller 80 may actuate a control valve to extend or retract the actuator 54, thereby moving the cutter frame 52 and the basecutter relative to the main frame 22. In other implementations, if the actuator 54 includes an electric actuator 54, the harvester controller 80 may control the actuator 54 by communicating an electric signal to the actuator 54 to cause the actuator 54 to extend or retract.

The harvester controller 80 may continuously monitor the current cutting torque of the cutting spindle 60 relative to the target cutting torque value, and continuously adjust the height of the cutting spindle 60 and the cutting blades 66 attached thereto as the sugarcane harvester 20 moves through the field during operation. By doing so, the crop cut height 50 may be maintained at a consistent elevation relative to an uneven and undulating ground surface 48 in which the elevation of the ground surface 48 changes relative to the basecutter assembly 30 as the sugarcane harvester 20 moves across the field.

In one aspect of the disclosure, the harvester controller 80 may be configured to calculate an estimated crop cut height 50 at a location based on the current cutting torque of the cutting spindle 60 while cutting the crop at that location. The step of calculating an estimated crop cut height 50 at various locations throughout the field is generally indicated by box 212 shown in FIG. 5. As described above, the torque experienced by the cutting spindle 60 is directly related to the crop cut height 50. As the crop cut height 50 relative to the ground surface 48 decreases, the torque experienced by the cutting spindle 60 increases. In other words, the current cutting torque of the cutting spindle 60 increases as the crop cut height 50 decreases. In contrast, as the crop cut height 50 relative to the ground surface 48 increases, the torque experienced by the cutting spindle 60 decreases. The current cutting torque of the cutting spindle 60 may be correlated to a crop cut height 50. The harvester controller 80 may make or define this correlation based upon previously defined tables or relationships developed via testing and product development, and which may be saved on the memory 110 of the harvester controller 80. At each location at which the harvester controller 80 determines the current cutting torque of the cutting spindle 60, the harvester controller 80 may further identify the location in the field at which that torque reading was sensed, and define the crop cut height 50 at that location.

By calculating or estimating the crop cut height 50 at several locations throughout the field based on the current cutting torque at each of the several different locations, the harvester controller 80 may generate a map of estimated crop cut height 50 at the different locations throughout the field. The step of generating the map of the estimated crop cut height 50 is generally indicated by box 214 shown in FIG. 5. The map may be configured as a two or three dimensional contour map, as a chart, as data points, or in some other manner capable of communicating the estimated crop cut height 50 at the several different locations throughout the field. As described above, the harvester controller 80 may be configured to reference the generated map of the estimated crop cut height 50 to define the target crop cut height 50 for future harvest operations, such as indicated by line 216 shown in FIG. 5.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A basecutter assembly for a sugarcane harvester, the basecutter assembly comprising:

a cutting spindle supporting a cutting blade for cutting crop;

a transport spindle supporting a transport device for moving the cut crop away from the cutting blade;

a first power source coupled to the cutting spindle and operable to rotate the cutting spindle, wherein the first power source includes a hydraulic motor operable in response to a fluid pressure;

a second power source coupled to the transport spindle and operable to rotate the transport spindle;

wherein the first power source is separate from the second power source such that the cutting spindle and the transport spindle are rotated independently of each other;

a torque sensor coupled to the first power source and operable to sense data related to a current fluid pressure of the first power source;

a harvester controller including a processor and a memory having a height control algorithm stored thereon, wherein the processor is operable to execute the height control algorithm to:

define a target cutting torque value for the cutting spindle based on a desired crop cut height;

determine a current cutting torque of the cutting spindle from data sensed by the torque sensor related to the current fluid pressure of the first power source while cutting the crop;

calculate an estimated crop cut height at a location based on the current cutting torque of the cutting spindle while cutting the crop at that location; and communicate a control signal to control a height of the cutting spindle relative to a ground surface based on a difference between the target cutting torque value of the cutting spindle and the current cutting torque of the cutting spindle while cutting the crop to adjust the crop cut height from the estimated crop cut height to achieve the desired crop cut height.

2. The basecutter assembly set forth in claim 1, wherein the processor is operable to execute the height control algorithm to determine the current cutting torque of the cutting spindle by subtracting an unloaded torque value of the cutting spindle from the current torque of the cutting spindle while cutting the crop.

3. The basecutter assembly set forth in claim 2, wherein the processor is operable to execute the height control algorithm to determine the unloaded torque value based on data from the torque sensor related to a fluid pressure of the first power source while not cutting the crop.

4. The basecutter assembly set forth in claim 1, wherein the processor is operable to execute the height control algorithm to generate a map identifying a plurality of locations and the respective estimated crop cut height at each of the plurality of locations.

5. The basecutter assembly set forth in claim 1, wherein the processor is operable to execute the height control algorithm to define the desired crop height based on the estimated crop cut height at the location.

6. A sugarcane harvester comprising:

a main frame;

a basecutter assembly supported by the main frame and moveable relative to the main frame to adjust a crop cut height relative to a ground surface;

wherein the basecutter assembly includes:

a cutting spindle supporting a cutting blade for cutting crop;

a transport spindle supporting a transport device for moving the cut crop away from the cutting blade;

a first power source coupled to the cutting spindle and operable to rotate the cutting spindle, wherein the first power source includes a hydraulic motor operable in response to a fluid pressure;

a second power source coupled to the transport spindle and operable to rotate the transport spindle;

wherein the first power source is separate from the second power source such that the cutting spindle and the transport spindle are rotated independently of each other; and a torque sensor coupled to the first power source and operable to sense data related to a current fluid pressure of the first power source;

a harvester controller including a processor and a memory having a height control algorithm stored thereon, wherein the processor is operable to execute the height control algorithm to:

define a target cutting torque value of the cutting spindle based on a desired crop cut height;

determine a current cutting torque of the cutting spindle from data sensed by the torque sensor related to the current fluid pressure of the first power source while cutting the crop;

calculate an estimated crop cut height at a location based on the current cutting torque of the cutting spindle while cutting the crop at that location;

communicate a control signal to control the height of the cutting spindle relative to the ground surface based on a difference between the target cutting torque value of the cutting spindle and the current cutting torque of the cutting spindle while cutting the crop to adjust the crop cut height from the estimated crop cut height to achieve the desired crop cut height.

7. The sugarcane harvester set forth in claim 6, wherein the processor is operable to execute the height control algorithm to determine the current cutting torque of the cutting spindle by subtracting an unloaded torque value from the current cutting torque of the cutting spindle while cutting the crop.

8. The sugarcane harvester set forth in claim 7, wherein the processor is operable to execute the height control algorithm to determine the unloaded torque value based on data from the torque sensor related to a fluid pressure of the first power source while not cutting the crop.

9. The sugarcane harvester set forth in claim 6, wherein the processor is operable to execute the height control algorithm to generate a map identifying a plurality of locations and the respective estimated crop cut height at each of the plurality of locations.

10. The sugarcane harvester set forth in claim 9, wherein the processor is operable to execute the height control algorithm to define the desired crop height based on the estimated crop cut height at one of the plurality of locations.

* * * * *